Feb. 6, 1945. S. J. WINSLOW 2,368,959
WALL OR TABLE MIRROR
Filed June 23, 1944 2 Sheets-Sheet 1
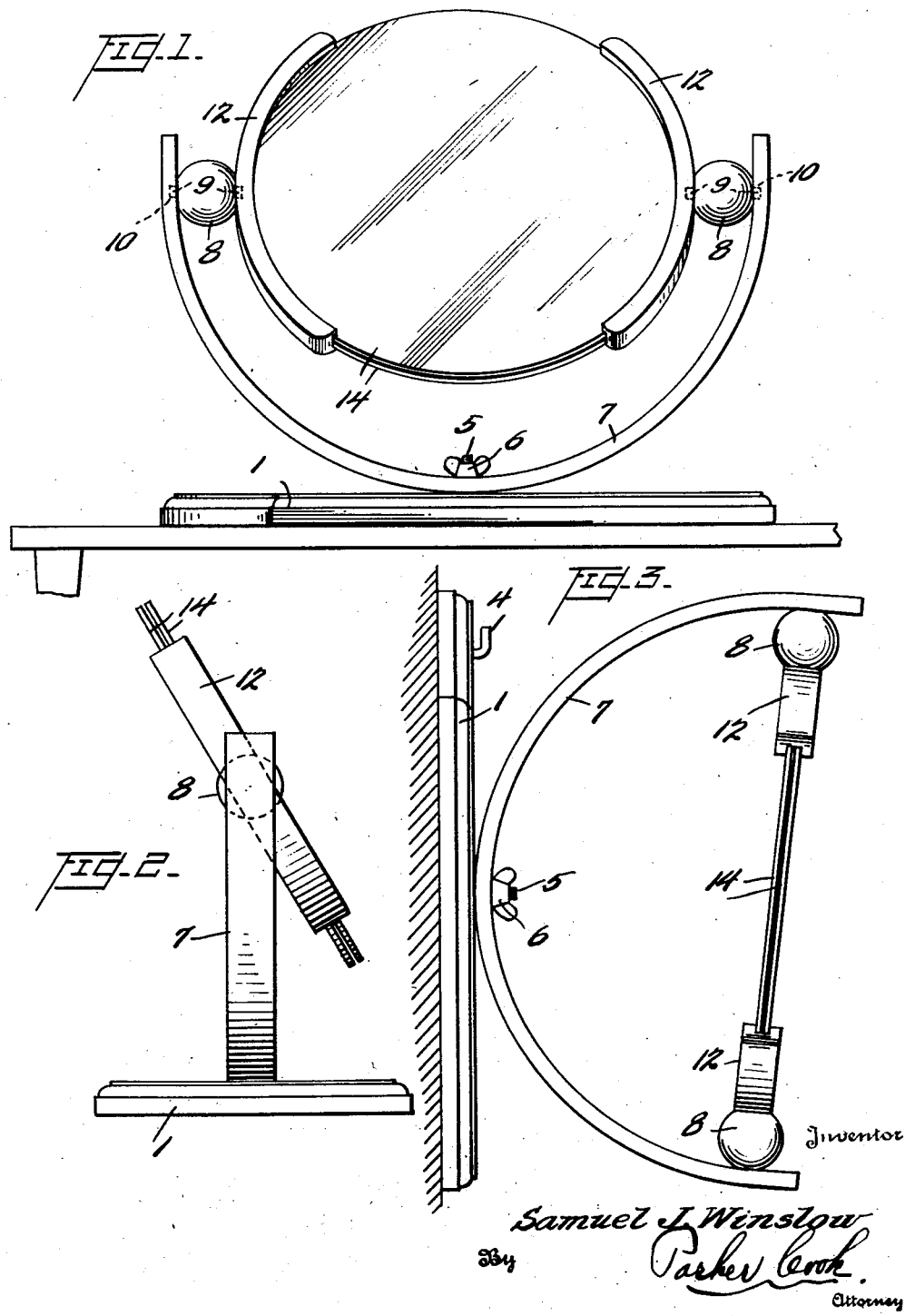
Inventor
Samuel J. Winslow
By Parker Cook
Attorney Feb. 6, 1945. S. J. WINSLOW 2,368,959
WALL OR TABLE MIRROR
Filed June 23, 1944 2 Sheets-Sheet 2
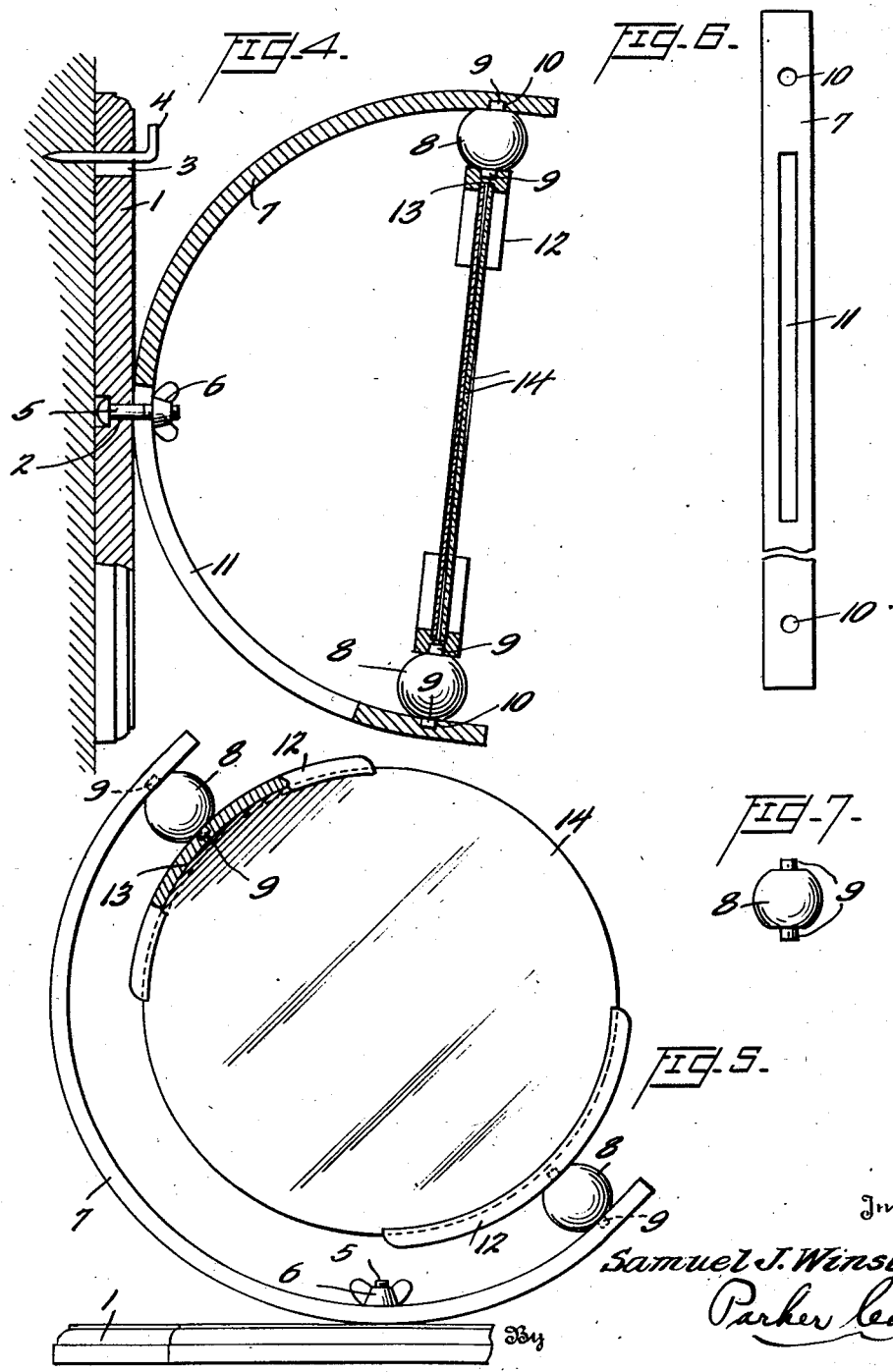
Inventor
Samuel J. Winslow,
Parker Cook.
By
Attorney Patented Feb. 6, 1945

2,368,959

UNITED STATES PATENT OFFICE 2,368,959

WALL OR TABLE MIRROR

Samuel J. Winslow, Providence, R. I.

Application June 23, 1944, Serial No. 541,784

1 Claim. (Cl. 88—97)

My invention relates to new and useful improvements in mirrors and has for an object to produce a mirror that may be hung on a wall or may be equally as well used as a mirror for a dressing table or the like.

One of the objects of the invention is to provide a mirror that is mounted for universal movement so that if hung on a wall the mirror or glass proper may be set at any desired angle to thus make it possible to accommodate the mirror to people of various heighth without changing the point of support of the mirror on the wall.

Still another object of the invention is to provide a mirror consisting of a plaque or base in which is positioned a resilient bow, while mounted on pintles in the bow is the mirror glass, so that when the mirror is placed on a dresser, the bow, if necessary, may be adjusted, after which the angle of the mirror glass may also be adjusted so that the user can quickly and readily adjust the mirror glass to the most desirable position.

Still another object of the invention is to provide a mirror that may be quickly and readily adjusted and at the same time will be fanciful in appearance and appeal to the aesthetic taste.

Still another object of the invention is to provide a mirror having a plaque and a bow (these parts to be made of wood, plastic or metal) and in the bow, supported for axial movement, a mirror glass, or more correctly, mirror glasses, as one side may be the ordinary glass mirror and the other side may be a glass mirror of the magnifying type.

Still another object of the invention is to provide a mirror that is quickly and readily assembled and wherein the parts, if desired, may all be made of wood with the exception of one adjusting screw and, of course, the two glasses.

With these and other objects in view, the invention consists in certain new and novel arrangements and combination of parts as will be hereinafter more fully described and pointed out in the claim.

Referring now to the drawings showing a preferred embodiment:

Fig. 1 is a side elevation showing the mirror supported on a table;

Fig. 2 is an edge view of the mirror as shown in Fig. 1;

Fig. 3 is a view similar to Fig. 1 but showing the mirror as supported on a wall;

Fig. 4 is a sectional view with the mirror in the same position as shown in Fig. 3;

Fig. 5 is a side view of the mirror as supported on a table, parts being broken away for the sake of clearness;

Fig. 6 is a detailed view of the bow or supporting arm; and

Fig. 7 is a detailed view of a knob with its pintles.

Referring now to the several views and for the moment to Fig. 1, there is shown a plaque 1, preferably made of wood, which is provided with a small counter-sunk opening 2 about centrally of the same, while a further opening 3 may be seen at the upper end of the plaque, so that this plaque may be conveniently supported on a hook 4 when the mirror is to be used as a wall mirror.

Extending through the counter-sunk opening 2 may be seen the small threaded bolt 5 with its wing nut 6.

Adjustably held to the plaque 1 by the bolt 5 and nut 6 is the supporting arm or resilient bow 7 which bow is substantially semi-circular in cross section.

As may be seen in Fig. 7, mounted in the opposite ends of the bow are the small knobs 8 with their pintles 9, the outer pintles of each knob fitting within respective sockets 10 formed internally of the bow near its opposite ends.

The bow 7 (Fig. 6) is also provided with a longitudinally extending slot 11 through which passes the aforementioned bolt 5 so that on a loosening of the nut 6 the bow may be moved about its polar axis and fastened at the desired angle from the vertical.

As may be clearly seen in Figs. 1 and 5 there is also provided two narrow arcuate strips 12 each of which is provided with the internal groove 13, and within the grooves of these two oppositely positioned strips 12 are the glass mirrors 14 which are positioned in back to back relationship to form a unit. Both mirrors may be of the ordinary form or one may be a magnifying mirror, that is slightly concave in cross section.

The inwardly extending pintles 8 on the knobs 9 are fitted centrally within the backs of these arcuate strips 12 as may be seen in the several views so that the mirror unit sprung in place will be supported from its opposite sides by the ends of the bow through, of course, the knobs, pintles and the small arcuate strips heretofore mentioned.

Thus it will be noted that the mirror unit, that is the mirror glasses, may be revolved about its polar or vertical central axis through 360 degrees, and the spring tension of the bow will tend to hold the mirror unit at any desired positioned angle. Also by having the bow slideably adjustable with respect to the plaque, the polar axis may be shifted to assume any one of a number of positions, for instance, as shown in Fig. 5.

Thus I have provided a mounting that somewhat resembles a gimbal and permits of many desired positions of the mirror unit.

As heretofore mentioned, the mirror may be used as a wall mirror and the plaque supported in a vertical position as shown in Figs. 3 and 4. To change the vertical central axis so that a shorter person might use the mirror, it is simply necessary to loosen the nut 6 and move the lower end of the bow slightly upwardly into the desired position, after which the nut 6 will be again fastened in place.

Again when the mirror is to be used on a dressing table, bureau, make-up table, vanity or the like, the plaque 1, which now functions as a base, will be laid on the table, or the like, and, as shown in Fig. 1, the unit with its mirror glasses 14 may be angularly positioned to suit the user.

Then should it be desired to use the magnifying mirror, the mirror unit might be revolved in either direction for 180 degrees.

Also, as shown in Fig. 5, the bow 7 may be moved so that the central vertical axis is now at an angle to the vertical and here again the mirror unit may be swung on its axis to a position desired by the user.

The bow and mirror when in this position is a very artistic one and it possibly presents a more fanciful looking article than in the position shown in Fig. 1.

From the foregoing it will be seen that I have provided a mirror that may be used as a wall mirror or a table mirror, the glasses forming the unit capable of being turned 360 degrees through its one axis, and the bow that holds the glasses capable of being moved 90 degrees with relation to its plaque or support, so that a greater variety of angles of the unit may be obtained.

It will also be seen that all of the parts may be made of wood except the mirror glasses and the one metal bolt and its nut, thus providing a relatively inexpensive article to manufacture. Furthermore, the several parts may be made up in quantities and the parts readily and easily assembled.

Finally, although the mirror is illustrated as made of wood, it will be understood that metal or plastic parts might be substituted for everything but the mirror glasses.

I claim:

A wall and table mirror including a flat supporting plaque, a resilient strip in the form of a semicircular wooden bow provided with a longitudinal extending slot, pivotal means passing through the plaque and the slot for holding the bow in a horizontal and vertical position perpendicular to the plaque, a unit including oppositely positioned internally slotted arcuate wooden strips, a mirror glass fitted within the slots in said strips, and each strip extending substantially one quarter of the distance around the mirror glass, oppositely disposed knobs with pintles thereon and the pintles respectively mounted in the bow and also centrally of said arcuate wooden strips, the said unit capable of being revolved through 360°, and the tension of the bow acting through said knobs holding the mirror unit in a desired predetermined position and also forcing the opposed strips against the mirror to hold the same tightly within the strips.

SAMUEL J. WINSLOW.